Figure 1:
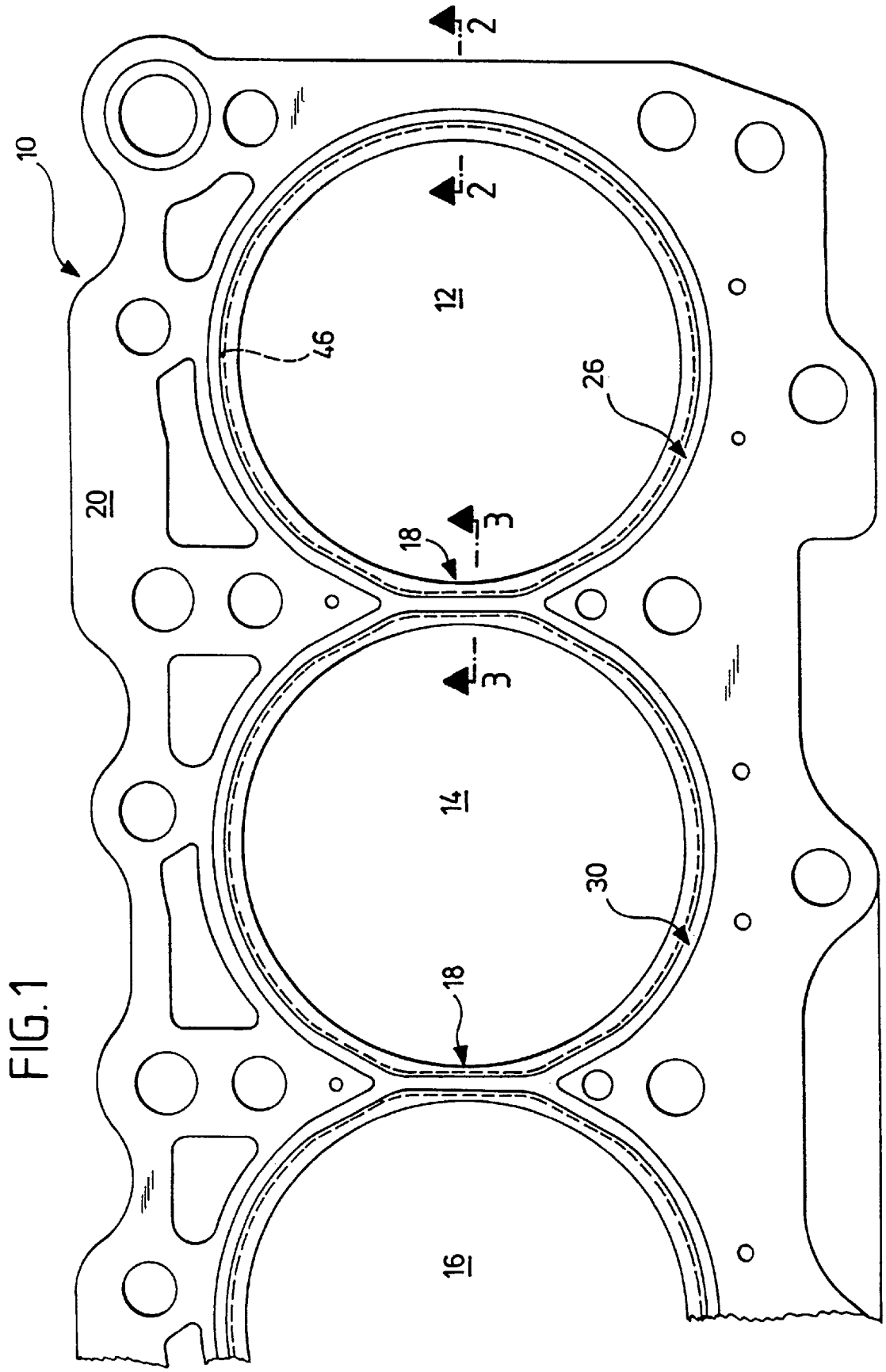

United States Patent
Buck et al.

[19]

[11] Patent Number: 6,053,503
[45] Date of Patent: Apr. 25, 2000

[54] CYLINDER HEAD GASKET WITH A GASKET PLATE HAVING SEVERAL SHEET-METAL LAYERS

[75] Inventors: Reinhold Buck, Hülben; Fritz Bleyh, Dettingen, both of Germany

[73] Assignee: Elring Klinger GmbH, Dettingen, Germany

[21] Appl. No.: 09/136,487

[22] Filed: Aug. 19, 1998

Related U.S. Application Data

[63] Continuation of application No. PCT/EP97/00662, Feb. 13, 1997.

[30] Foreign Application Priority Data

Feb. 21, 1996 [DE] Germany ............... 196 06 382

[51] Int. Cl.[7] ..................................................... F02F 11/00
[52] U.S. Cl. ........................... 277/592; 277/594; 277/598
[58] Field of Search ................... 277/591, 593, 277/594, 595, 598, 592

[56] References Cited

U.S. PATENT DOCUMENTS

| | | | |
|---|---|---|---|
| 5,280,928 | 1/1994 | Ueta et al. | 277/595 |
| 5,286,039 | 2/1994 | Kawaguchi et al. | 277/593 |
| 5,385,354 | 1/1995 | Hagiwara et al. | 277/594 |
| 5,431,418 | 7/1995 | Hagiwara et al. | 277/595 |
| 5,568,932 | 10/1996 | Tanaka et al. | |
| 5,713,580 | 2/1998 | Ueta | 277/593 |

FOREIGN PATENT DOCUMENTS

| | | |
|---|---|---|
| 0486817 | 10/1990 | European Pat. Off. . |
| 0533357 | 3/1993 | European Pat. Off. . |
| 05442156 | 6/1993 | European Pat. Off. . |
| 0633396 | 1/1995 | European Pat. Off. . |
| 0468526 | 4/1995 | European Pat. Off. . |
| 7253162 | 10/1995 | Japan . |

*Primary Examiner*—Anthony Knight
*Assistant Examiner*—Karlena D. Schwing

[57] ABSTRACT

Cylinder head gasket with a gasket plate having several sheet-metal layers and at least one combustion chamber aperture, wherein a first outer sheet-metal layer is provided with an annular bead which surrounds the combustion chamber aperture, projects in the direction towards an adjacent, second sheet-metal layer and abuts against the latter, and wherein to limit the deformation of the bead a metal spacer ring is attached by welding to one of the two layers radially adjacent to the bead, the spacer ring facing the other layer and surrounding the combustion chamber aperture; in order to make a simple optical examination of the quality of the welding join possible, the spacer ring is attached in a gas-tight manner to the layer supporting it by a continuous, annular laser welding seam closed upon itself and uniform except for an area of overlap, wherein the seam is doubled in the area of overlap.

9 Claims, 3 Drawing Sheets

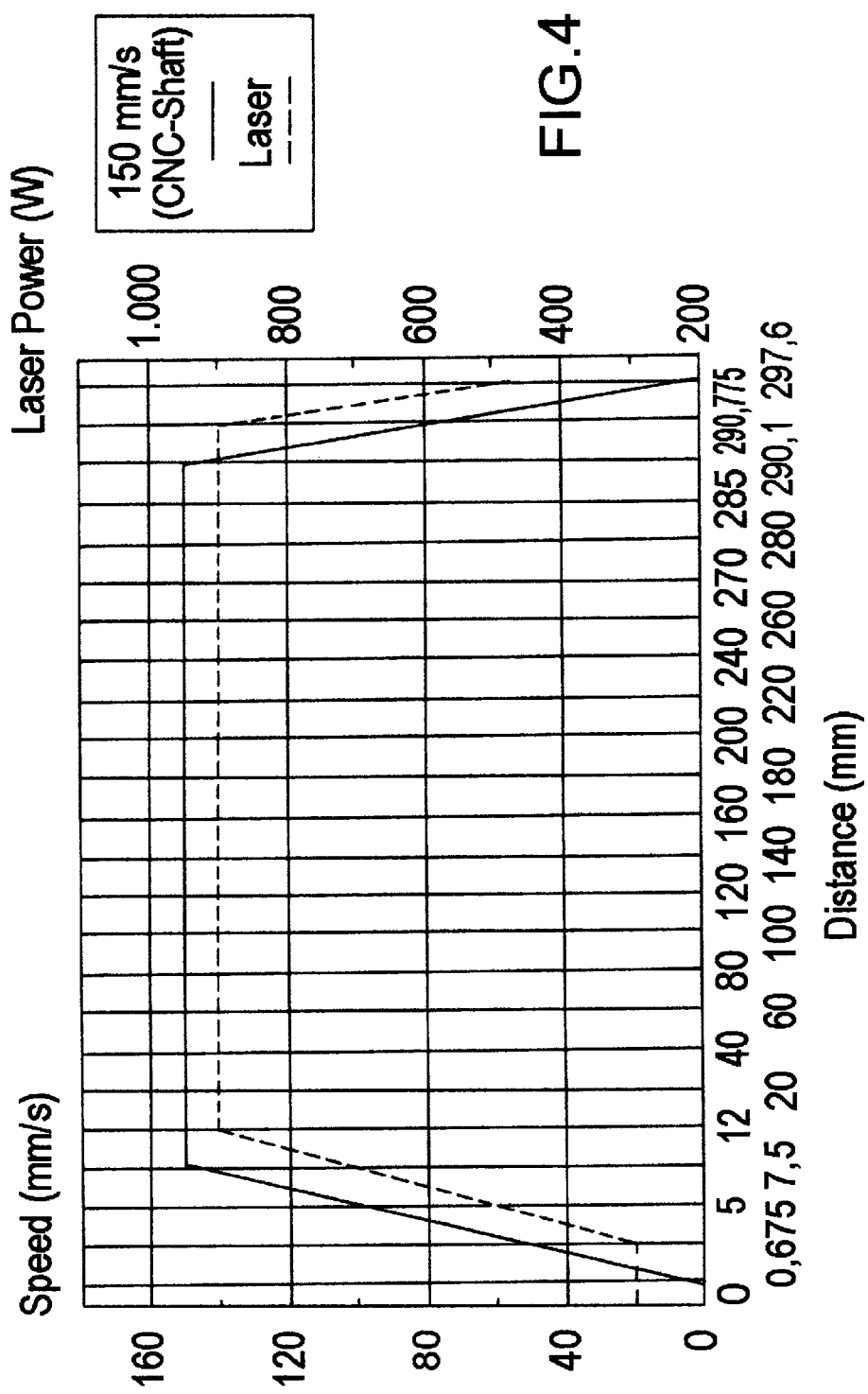

CYLINDER HEAD GASKET WITH A GASKET PLATE HAVING SEVERAL SHEET-METAL LAYERS

This is a continuation of international PCT application No. PCT/EP97/00662 having international filing date of Feb. 13, 1997, which designates the United States.

The invention relates to a cylinder head gasket with a gasket plate which has several sheet-metal layers and at least one combustion chamber aperture, wherein a first outer sheet-metal layer is provided with an annular sealing element which surrounds the combustion chamber aperture, projects in the direction towards an adjacent, second sheet-metal layer and abuts against the latter and is elastically deformable at right angles to the gasket plate, and wherein to limit the deformation of the sealing element a metal spacer ring is attached by welding to one of the two layers radially adjacent to the sealing element, this spacer ring facing the other layer, surrounding the combustion chamber aperture and being covered by the two layers and its thickness measured at right angles to the gasket plate being only a fraction of the thickness of each of the two layers. The sealing element is intended to be, in particular, a bead which preferably has a cross section in the shape of a circular arc; in the case of those cylinder head gaskets, with which the sealing element is arranged close to the combustion chamber aperture, the outer sheet-metal layer can, however, also be merely bent at an angle and form a so-called semi-bead; fundamentally, sealing elements other than bead-shaped, which deform elastically at right angles to the plane of the gasket plate during tightening of the cylinder head screws and during operation of the engine, are, in any case, also conceivable.

The various metal layers of multilayered metal gasket plates of cylinder head gaskets have so far been joined to one another by means of electric spot welding. In this respect, there is, however, a considerable problem with regard to the reliability of the join: It is not apparent from the laminate consisting of the various metal layers after welding whether the various layers are, in fact, welded through and, consequently, securely joined to one another. Electrode impressions at the visible sides of the external layers result solely due to the high pressing forces of the electrodes, and even when a sufficient welding current has flowed between the latter, this does not mean that this has flowed along an imaginary straight joining line between the two electrodes—when two metal layers do not abut against one another at this point so as to make contact but at a different point, the current flows along the metal layers to this other point and so, in certain circumstances, welding results at an entirely undesired location.

EP-0 486 817-B1 discloses a cylinder head gasket with a gasket plate formed from a sheet-metal layer and a sheet-metal sealing ring attached to this sheet-metal plate by laser spot welding, this ring directly surrounding a combustion chamber opening of the sheet-metal layer as well as serving to limit the elastic deformation of a bead (in particular, during the tightening of the cylinder head screws) which is formed in the sheet-metal layer forming the gasket plate, encircles the combustion chamber opening and the sealing ring annularly as well as has a height which is somewhat greater than the thickness of the sealing ring. The welding spots serving to attach the sealing ring to the metal layer forming the gasket plate are thereby designed and arranged such that their diameter is somewhat greater than their center-to-center distance measured in circumferential direction of the sealing ring and so adjacent welding spots overlap. The laser beam is thereby directed onto the upper side, i.e., the visible side of the sealing ring so that the annular surface of the sealing ring abutting against the cylinder head (or, where applicable, against the engine block) has a flake-like surface structure.

It has been shown that even with a cylinder head gasket produced in accordance with EP-0 486 817-B1 the safety of the laser spot welding process is not necessarily ensured and that an optical examination of the laser welding spots does not allow any reliable conclusion concerning a secure join between the sealing ring and the sheet-metal layer forming the gasket plate. However, if an element of the cylinder head gasket adjacent to a combustion chamber aperture becomes detached from the gasket plate during operation of the engine on account of engine dynamics and passes into the combustion chamber, this can lead to immediate destruction of the engine.

The object underlying the invention was to see to it, in a cylinder head gasket of the type mentioned at the outset, that a greater safety can be brought about by means of a simple optical examination to the effect that the spacer ring has been permanently joined securely and tightly to the sheet-metal layer of the gasket supporting it.

This object may be accomplished in accordance with the invention in that the spacer ring is attached in a gas-tight manner to the layer supporting it by a continuous, annular laser welding seam closed upon itself and uniform except for an area of overlap, the seam being doubled in the area of overlap.

It has, completely surprisingly, been shown that during the welding on of such a spacer ring by means of a laser operating in continuous-wave operation, wherein the laser beam is directed onto the welding location from the side of the spacer ring, when a location is not welded through the spacer ring displays annealing colors at this location on its visible side, an effect which does not visibly occur or at least not clearly during laser spot welding for reasons which are not so far comprehensible.

During the production of a cylinder head gasket configured in accordance with the invention a simple optical examination of the spacer ring is sufficient after carrying out the welding process in order to ascertain whether the laser welding seam has been welded through all over its length, i.e. whether the spacer ring has been securely joined all over to the sheet-metal layer supporting it. Apart from the fact that it is easy to check in this way whether a permanently secure join between spacer ring and gasket plate has been brought about, the invention also enables a simple examination to be made as to whether the spacer ring has been joined in a gas-tight manner to the sheet-metal layer supporting it all along its circumference which is important when the cylinder head gasket is configured such that the spacer ring also undertakes the function of a sealing element surrounding the combustion chamber aperture.

During the laser welding of metals, it is not possible to avoid vapors generated by the workpiece during the welding from leading to deposits on the optical means focusing the laser beam in the welding point. During laser spot welding, i.e. during operation with a pulsed laser, the laser beam pulses are extremely short, and it has been shown that deposits of this type on the laser beam optical means lead, after a certain number of laser beam pulses, to such a reduction in the laser beam energy impinging on the workpiece per laser welding spot that a through-welding would no longer be ensured for this reason alone, if the laser beam optical means was not cleaned which does, of course, entail considerable resources. Surprisingly, very many more spacer rings may be welded on with a laser operating in continuous-wave operation than by means of laser beam spot welding before the laser beam optical means has to be cleaned, quite apart from the fact that the welding time per spacer ring is very much shorter for continuous-wave welding than for spot welding.

Finally, the invention also has t he following advantage: If the welding principle resulting from EP-0 486 817-B1 were to be transferred to the attachment of the spacer ring of a cylinder head gasket of the type mentioned at the outset, this would lead all the more to the risk of a part of the cylinder head gasket which surrounds a combustion chamber becoming detached from the cylinder head gasket during operation of the engine on account of the engine dynamics and falling into the combustion chamber: Since, during operation of the engine, the bead of the outer sheet-metal layer is elastically flattened periodically and repeatedly elevated again therebetween, the working of the bead automatically leads to an oscillating sliding movement of the outer sheet-metal layer, which is radial in relation to the combustion chamber axis, between spacer ring and the adjacent cylinder head (or engine block); the rough upper surface of the spacer ring resulting on account of the laser welding process according to EP-0 486 817-B1 then entails the risk that an annular area, which surrounds the combustion chamber, of the sheet-metal layer abutting against the spacer ring will become separated from this sheet-metal layer on account of these sliding movements and may fall into the combustion chamber.

When it is mentioned above that the laser welding seam forms a ring closed upon itself, this is also to be understood as a welding seam, with which in the plan view beginning and ending areas of the welding seam are located next to one another, i.e. that in the area of overlap beginning and ending areas do not coincide. Furthermore, the reference to the fact that the laser welding seam "is doubled" in the area of overlap is not intended to mean that beginning and ending areas of the welding seam have been welded with the same laser beam intensity or rather energy as the non-overlapping areas of the welding seam (in this respect, reference is made to the following comments).

If the laser beam is directed onto the welding point through the spacer ring, the duration of the process is, in practice, independent of the thickness of the metal sheet used for the production of the spacer ring since the thickness of the spacer ring is considerably less than the thickness of the sheet-metal layer supporting the spacer ring; in preferred embodiments of the inventive cylinder head gasket, the thickness of the spacer ring is approximately 0.1 to 0.15 mm and that of the second sheet-metal layer approximately 0.6 to 1.1 mm, preferably approximately 0.85 to 1.05 mm.

Fundamentally, it would be possible with an inventive cylinder head gasket for the sealing element provided on the outer sheet-metal layer to be located radially within the spacer ring; embodiments are, however, preferred, with which the spacer ring forms a sealing element directly adjoining the combustion chamber aperture.

The basic principle of the present invention is suitable not only for cylinder head gaskets with a sheet-metal layer supporting the spacer ring and an outer sheet-metal layer covering the spacer ring but also, for example, for those cylinder head gaskets, with which an inner sheet-metal layer is arranged between two outer sheet-metal layers provided with sealing elements. So that an undesirably great deformation of the sealing elements of the two outer sheet-metal layers can be avoided with one single spacer ring, it is recommended that such a cylinder head gasket be designed such that the inner sheet-metal layer is bent at an angle radially adjacent to the spacer ring to an extent which is smaller than the thickness of the spacer ring.

So that a welding seam which is uniform all over results with respect to the energy input, it is proposed to create a process for the attachment of the spacer ring of an inventive cylinder head gasket such that a laser beam optical means focusing a laser beam of a continuous-wave laser onto the boundary surface between the spacer ring and the sheet-metal layer supporting it and the spacer ring together with the sheet-metal layer supporting it are moved relative to one another along a path corresponding to the laser welding seam to be generated such that an acceleration from a standstill to a final speed takes place along a first section of the path, that a second section of the path which is many times larger than the first section is traveled along with this final speed, and that along a third section of the path which coincides at least essentially with the first section a braking as far as a standstill takes place, wherein the power of the laser beam is kept at least essentially constant at a final power along approximately the second section of the path, is increased at least essentially constantly up to this final power along approximately the first section of the path and reduced at least essentially constantly along approximately the third section of the path. As a result of such a control of the power of the laser beam, the fact can be taken into account that the inert masses of the laser welding machine which are to be accelerated are accelerated at the beginning of the welding process and have to be braked at the end of the welding process, for which purpose a finite time is respectively required, and in these periods of time the described control of the power of the laser beam sees to it that during welding with a low path speed the metal of, in particular, the spacer ring does not melt away.

Normally, spacer rings of cylinder head gaskets of the type mentioned at the outset are produced from spring steel sheets. It has now been shown that during the welding on of a spacer ring made from a spring steel sheet its radially outer edge region tends to lift somewhat from the support sheet. For this reason, the spacer rings in preferred embodiments of the inventive cylinder head gasket are produced from a steel other than spring steel because it has surprisingly been shown that the radially outer regions of such spacer rings "fasten" onto the surface of the support sheet facing the rings during the welding process and so after termination of the welding process it is no longer even possible to lift the outer edge regions of the spacer rings from the support sheet with a tool.

Figure 2:
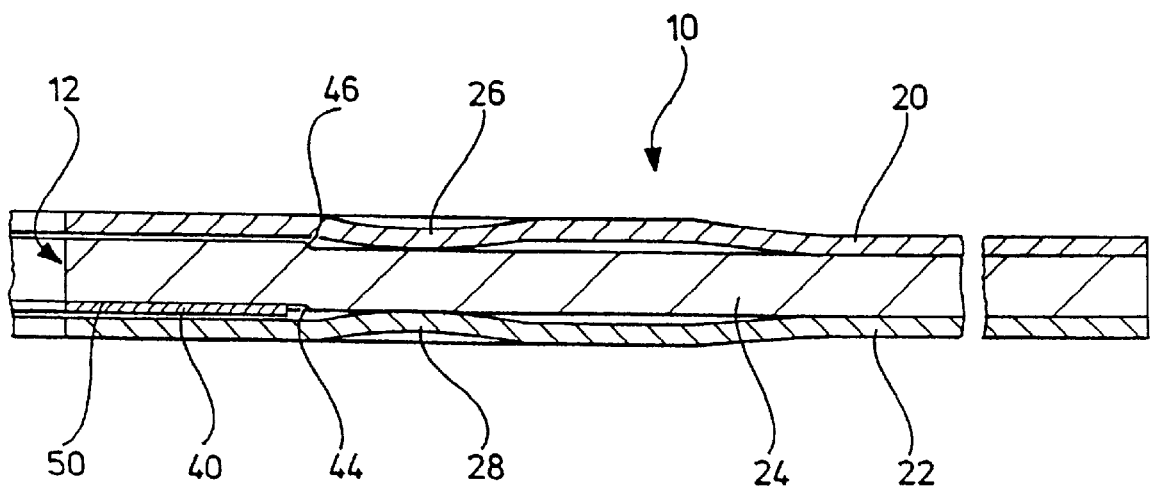
Figure 3:
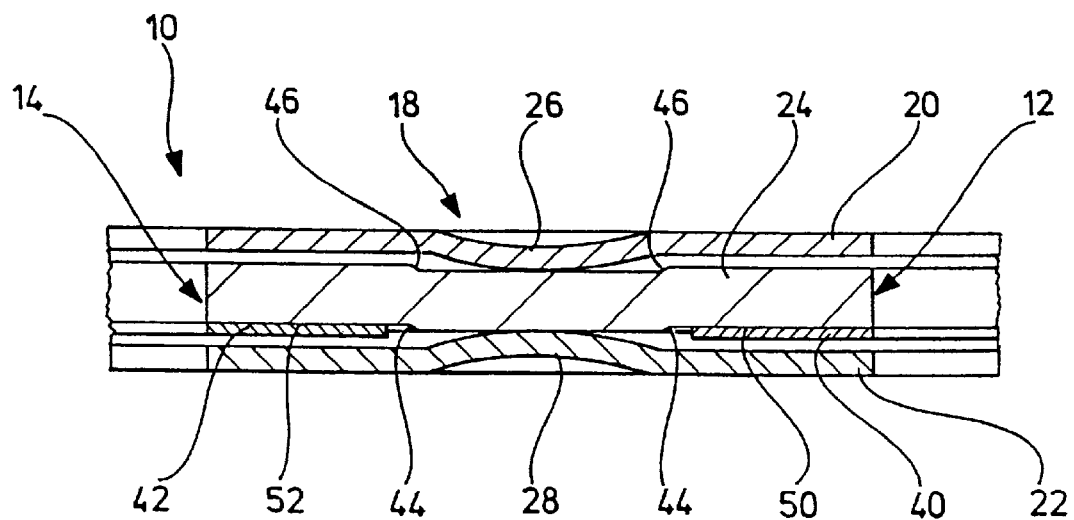

Additional features, advantages and details of the invention result from the following description of a preferred embodiment of the inventive cylinder head gasket and its production, wherein reference is made to the attached drawings; these show:

FIG. 1 a plan view of part of the cylinder head gasket;

FIG. 2 a section through an edge region of this cylinder head gasket corresponding to the line 2—2 in FIG. 1;

FIG. 3 a section through a web region of the cylinder head gasket located between two combustion chamber apertures corresponding to the line 3—3 in FIG. 1, and FIG. 4 a diagram to explain the relative movement between laser beam optical means and that sheet-metal layer, to which the spacer ring is to be attached, as well as the laser power controlled as a function of the welding path and time, respectively, during the welding of the spacer ring to this sheet-metal layer.

The inventive cylinder head gasket illustrated in FIG. 1 has a gasket plate 10, in which several combustion chamber apertures are located next to one another, of which only the apertures 12 and 14 are illustrated as a whole and the adjacent aperture 16 in part. The gasket plate 10 forms relatively narrow web regions 18 between adjacent combustion chamber apertures. As for the rest, the cylinder head gasket will not be described in further detail since this is not required for understanding the present invention.

In FIGS. 2 and 3, the edges of the combustion chamber apertures have been given the reference numerals used for these apertures in FIG. 1, and since FIG. 3 illustrates a section through the one web region 18, this reference numeral has also been included in FIG. 3.

As is apparent from FIGS. 2 and 3, the illustrated embodiment of the inventive cylinder head gasket has a gasket plate which essentially consists of three sheet-metal layers, namely of two outer layers 20 and 22 and a center layer 24 arranged between the two outer layers, wherein the sheet thickness of the center layer is very much greater than that of the outer layers 20, 22.

Each of the combustion chamber apertures of the inventive cylinder head gasket is completely surrounded by sealing elements which, in the illustrated embodiment, have the shape of beads which have been produced in the outer layers 20 and 22 by way of stamping processes. The beads surrounding the combustion chamber aperture 12 have been designated as 26 and 28, their cross section is in the shape of a circular arc, they project in the direction towards the center layer 24 and abut on the center layer 24 with their domes, namely not only when the cylinder head gasket is installed in an engine but already in the finished cylinder head gasket prior to its installation. The sheet-metal layers 20, 22 and 24 are securely joined to one another at certain locations of the gasket plate 10, such as, for example, in the edge region of the gasket plate illustrated to the right in FIG. 2.

The reference numeral 26 for the bead surrounding the combustion chamber aperture 12 has been included in FIG. 1, likewise the reference numeral 30 for a bead generated in the outer layer 20 and surrounding the combustion chamber aperture 14. As is now apparent from FIG. 1 in conjunction with FIG. 3, the narrow web region 18 between the apertures 12 and 14 causes the beads 26 and 30 to coincide in this web region, i.e. run into one another, and the same applies for the beads generated in the outer layer 22; for this reason, only the reference numerals 26 and 28 have been included in FIG. 3 since only one single bead is present in each outer layer in the region of the section 3—3.

So that the beads can fulfill their sealing function, namely the task of preventing gases from being able to escape from the combustion chambers between the sheet-metal layers 20 and 24 and 22 and 24, respectively, in radial direction (in relation to the combustion chamber axes), the beads must still be able to yield elastically in the direction at right angles to the plane of the gasket plate 10 when the cylinder head screws are tightened and during operation of the engine and abut resiliently against the center layer 24; this presupposes that the beads cannot be pressed completely flat by pressing forces oriented at right angles to the plane of the gasket plate 10. In order to ensure this, each combustion chamber aperture is surrounded by a spacer ring, the aperture 12 by a spacer ring 40, the aperture 14 by a spacer ring 42. These spacer rings are produced from a sheet metal, the thickness of which is, in accordance with the invention, only a fraction of the thickness of that sheet-metal layer, to which the relevant spacer ring is attached. In the illustrated embodiment, the spacer rings are attached to the center layer 24, the sheet thickness of the spacer rings is also, however, advantageously only a fraction of the sheet thickness of the outer layer 20 and the outer layer 22, respectively. However, the metal spacer rings can be attached to the layer 22 instead.

In order to limit the deformation not only of the beads of the outer layer 20 but also the beads of the outer layer 22 in the desired manner, a respective spacer ring could be secured around each combustion chamber aperture on each side of the center layer 24; in order, however, to make do with one single spacer ring for each combustion chamber aperture, the center layer 24 for each combustion chamber aperture is provided with an angled bend which surrounds the latter in a ring shape and on that side of the center layer, to which the spacer rings are attached, forms a step 44 which surrounds the relevant combustion chamber aperture at a radial distance in a ring shape and projects in the direction towards the outer layer 22. On the other side of the center layer 24, a step 46 thereby results for each step 44 and this leads to a corresponding recess. When the height of the steps 44 is less than the sheet thickness of the spacer rings, the latter prevent the beads in the outer layer 22 from being able to be pressed completely flat. In an analogous manner, those regions of the center layer 24 which are located between the steps 46 and the adjacent combustion chamber apertures prevent the beads of the outer layer 20 from being able to be pressed completely flat by the pressing forces mentioned.

It is, finally, of advantage for the sealing effect of the beads when the two sides of the center layer 24 and/or the sides of the outer layers 20 and 22 facing the latter are coated with a conventional sealing material.

In FIGS. 2 and 3, those laser welding seams 50 and 52 are indicated, by which the spacer rings 40 and 42 are joined in a gas-tight manner to the center layer 24 (non-coated areas). As is apparent from the preceding comments, the laser welding seam 50 surrounds the combustion chamber aperture 12, the laser welding seam 52 the combustion chamber aperture 14, namely each in an approximately circular ring shape, wherein each laser welding seam is doubled in a circumferential region (how this term is to be understood has already been explained).

FIG. 4 shows a diagram, to which the following is to be noted:

The laser beam optical means, with the aid of which the welding process is carried out, is supported by an X-Y carriage which may be displaced in accordance with the program and in relation to a table of the laser welding machine, which supports the center layer 24, by means of two computer numerical control drive shafts in two directions at right angles to one another, namely parallel to the said table, in order to thus be able to pass with the laser beam optical means along a circular ring which corresponds to the welding seam to be produced. As is apparent from FIG. 4, the two computer numerical control drive shafts allow the path to be covered by the laser beam optical means to be traveled along with a maximum path speed measured along this path of 150 mm/s as well as an acceleration or braking of 1500 mm/s$^2$.

In the diagram illustrated in FIG. 4, the solid line represents the path speed of the laser beam optical means along the distance covered, the dashed line the laser power along the distance covered.

All sheet metals may be welded with the inventive process, with the exception of copper, aluminum and aluminum-plated sheets.

The following material is particularly recommended for the center layer: ST2 K50 BK GK, DIN (=German Industrial Standard) 1624/1544 1.0330 in thicknesses between 0.6 mm and 1.1 mm.

The following materials are particularly recommended for the spacer rings: ST4 LG BK, DIN 1624/1544 1.0338 with a thickness of approximately 0.1 mm or X5 Cr Ni 189 m KG, DIN 17440/59381 1.4301.

In the illustrated, preferred embodiment, the sheet thickness of the center layer 24 is 1.05 mm, the sheet thickness of each of the two outer layers 20 and 22, respectively, is 0.25 mm and the sheet thickness of the spacer rings 40 and 42, respectively, is 0.10 mm. The domes of the beads 26 and 28 each project in the non-deformed state of the beads approximately 0.18 mm beyond the side of the relevant outer layer facing the center layer 24, and the height of the steps 44, 46 is approximately equal to half the sheet thickness of the spacer rings 40, 42.

The present disclosure relates to the subject matter disclosed in International Application No. PCT/EP97/00662 (WO 97/31204) of Feb. 13, 1997, the entire specification of which is incorporated herein by reference.

We claim:

1. A cylinder head gasket with a gasket plate having several sheet-metal layers and at least one combustion chamber aperture, wherein a first outer sheet-metal layer is provided with an annular sealing element surrounding the combustion chamber aperture, projecting in a direction towards an adjacent, second sheet-metal layer and abutting against said second layer, said sealing element being elastically deformable perpendicularly to the gasket plate, wherein to limit the deformation of the sealing element a metal spacer ring is attached by a welded seam to one of said first and second layers radially adjacent to the sealing element, said spacer ring facing the other one of said first and second layers, surrounding the combustion chamber aperture and being covered by said first and second layers, said spacer ring having a thickness measured at right angles to the gasket plate that is only a fractional part of the thickness of each of said first and second layers, and wherein the spacer ring is attached by a continuous-wave laser welded seam to said one of said first and second layers such that said welded seam (i) is a continuous, annular welded seam closed upon itself, (ii) provides for a gas-tight connection between the spacer ring and said one of first and second layers, (iii) is uniform except for an area of overlap, and (iv) is doubled in said area overlap.

2. The cylinder head gasket as defined in claim 1, wherein the welding seam has a structure obtained by welding with a laser beam directed through the spacer ring onto a welding location in which the spacer ring is welded to said one of said first and second layers.

3. The cylinder head gasket as defined in claim 1, wherein the thickness of the spacer ring is approximately 0.1 to 0.15 mm and the thickness of the second layer is approximately 0.6 to 1.1 mm.

4. The cylinder head gasket of claim 3, wherein the thickness of said second layer is approximately 0.85 to 1.05 mm.

5. The cylinder head gasket as defined in claim 1, wherein the spacer ring forms an additional sealing element directly adjoining the combustion chamber aperture.

6. The cylinder head gasket as defined in claim 1, wherein an additional outer sheet-metal layer is provided, said second layer being arranged between said additional outer layer and said first layer, said second layer being bent at angles radially adjacent to the spacer ring to an extent smaller than the thickness of the spacer ring, and wherein said additional outer layer is also provided with a sealing element corresponding to the sealing element of the first layer.

7. The cylinder head gasket of claim 1, wherein said sealing element is a bead formed in said first layer.

8. A process for making a cylinder head gasket with a gasket plate having several sheet-metal layers and at least one combustion chamber aperture, wherein a first outer-sheet metal layer is provided with an annular sealing element surrounding the combustion chamber aperture, projecting in a direction towards an adjacent, second sheet-metal layer and abutting against said second layer, said sealing element being elastically deformable perpendicularly to the gasket plate, wherein to limit the deformation of the sealing element a metal spacer ring is attached by a welding seam to one of said first and second layers radially adjacent to the sealing element, said spacer ring facing the other one of said first and second layers, surrounding the combustion chamber aperture and being covered by said first and second layers, said spacer ring having a thickness measured at right angles to the gasket plate that is only a fractional part of the thickness of each of said first and second layers, and wherein the spacer ring attached by continuous-wave laser welding to said one of said first and second layers such that said welding seam (i) is a continuous, annular welding seam closed upon itself, (ii) provides for a gas-tight connection between the spacer ring and said one of said first and second layers, (iii) is uniform except for an area of overlap, and (iv) is doubled in said area of overlap, wherein a laser beam optical system focusing a laser beam of a continuous-wave laser onto an interface between said spacer ring and said one of said first and second layers as well as said spacer ring together with said one layer are moved relative to one another along a path corresponding to said laser welding seam to be generated in such a manner that an acceleration from a standstill to a final speed takes place along a first section of said path, wherein a second section of said path many times larger than said first section is traveled along at said final speed, and wherein along a third section of said path coinciding at least essentially with said first section a deceleration as far as a standstill takes place, and wherein the power of the laser beam (i) is kept at least essentially constant at a final power along approximately the second section of the path, (ii) is increased at least essentially constantly up to the final power along approximately the first section of the path and (iii) is reduced at least essentially constantly along approximately the third section of the path.

9. The process as defined in claim 6, wherein the laser beam is directed onto said interface through the spacer ring.

* * * * *